(12) United States Patent
Varnica et al.

(10) Patent No.: US 9,443,551 B1
(45) Date of Patent: Sep. 13, 2016

(54) METHOD AND SYSTEM FOR WRITING AND READING CLOSELY-SPACED DATA TRACKS

(71) Applicant: Marvell International Ltd., Hamilton (BM)

(72) Inventors: Nedeljko Varnica, San Jose, CA (US); Panu Chaichanavong, Bangkok (TH); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/687,620

(22) Filed: Apr. 15, 2015

Related U.S. Application Data

(60) Provisional application No. 61/980,379, filed on Apr. 16, 2014.

(51) Int. Cl.
G11B 5/02 (2006.01)
G11B 20/12 (2006.01)
G11B 20/18 (2006.01)
G11B 20/10 (2006.01)
G11B 5/012 (2006.01)
G11B 7/14 (2012.01)

(52) U.S. Cl.
CPC .............. *G11B 20/12* (2013.01); *G11B 5/02* (2013.01); *G11B 20/10305* (2013.01); *G11B 20/1833* (2013.01); *G11B 5/012* (2013.01); *G11B 7/14* (2013.01); *G11B 20/10361* (2013.01)

(58) Field of Classification Search
None
See application file for complete search history.

(56) References Cited

U.S. PATENT DOCUMENTS

| | | | |
|---|---|---|---|
| 2011/0267933 A1* | 11/2011 | Ross et al. | 369/47.15 |
| 2013/0094337 A1* | 4/2013 | Yajima et al. | 369/44.23 |
| 2014/0160590 A1* | 6/2014 | Sankaranarayanan | G11B 5/09 360/45 |
| 2014/0240868 A1* | 8/2014 | Inch | G11B 5/56 360/94 |

* cited by examiner

Primary Examiner — Brian Butcher

(57) ABSTRACT

A method for writing data onto a medium on which data are stored in tracks includes encoding the data into at least one codeword, and writing a respective portion of each of the at least one codeword onto respective different tracks on the medium. The writing may include writing a respective portion of each of the at least one codeword onto respective different adjacent tracks on the medium. Another method for reading data includes positioning a plurality of read heads to read codewords that have been written across multiple tracks of a medium. Each read head in the plurality of read heads reads a different portion of the first group of the multiple tracks, and where each different portion of the multiple tracks overlaps at least one other different portion of the multiple tracks. Signals are detected from the plurality of read heads, and the detected signals are decoded.

8 Claims, 9 Drawing Sheets

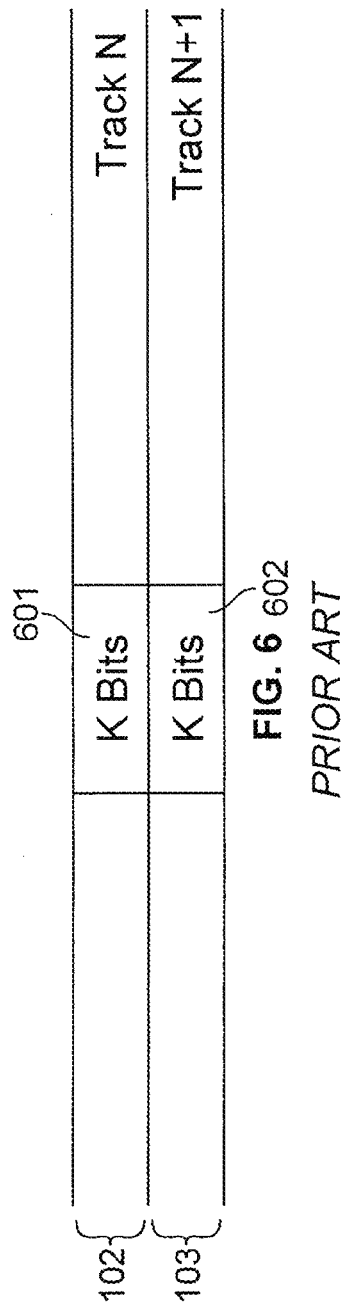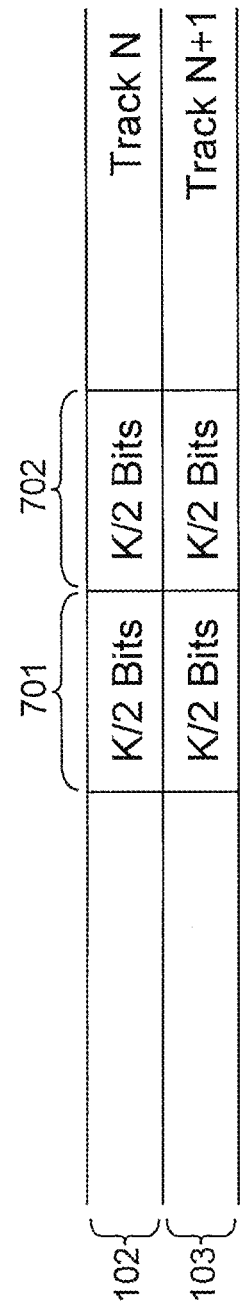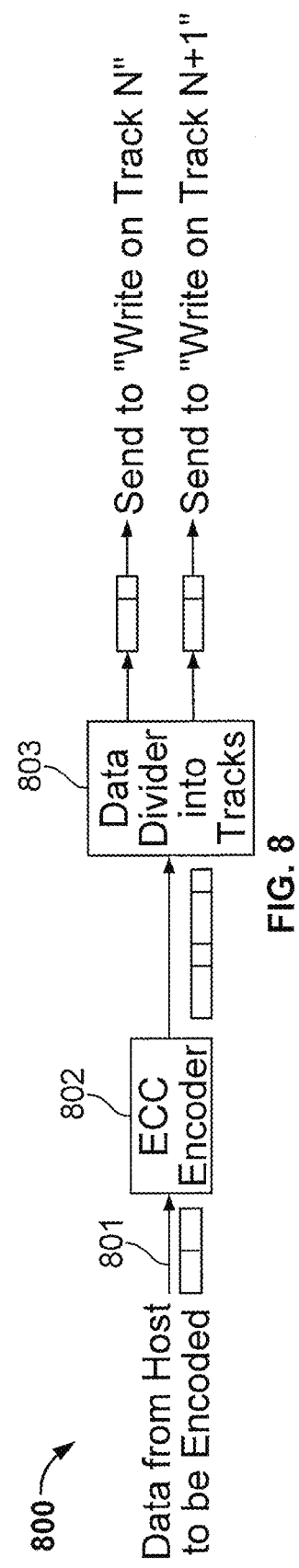

ial Patent Application No. 61/980,379, filed Apr. 16, 2014, which is hereby incorporated by reference herein in its entirety.

METHOD AND SYSTEM FOR WRITING AND READING CLOSELY-SPACED DATA TRACKS

CROSS REFERENCE TO RELATED APPLICATION

This claims the benefit of commonly-assigned U.S. Provisional Patent Application No. 61/980,379, filed Apr. 16, 2014, which is hereby incorporated by reference herein in its entirety.

FIELD OF USE

This disclosure relates to data storage systems of the type in which read and write heads move over tracks of data on a storage medium. More particularly, this disclosure relates to the writing and reading of data tracks that are closely-spaced with an adjacent track or tracks.

BACKGROUND

In magnetic recording, as one example of a type of recording in which reading and writing are performed by a head that moves relative to the surface of the storage medium, data may be written in circular (or sometime spiral) tracks on a magnetic disk. In many magnetic recording systems, minimum track pitch is limited by the write head width, while the read head is designed to be narrower than the write head so that reading can occur without picking up signals from any adjacent track. In addition, guard bands—empty bands on either side of each track—are provided to help prevent data on one track from being overwritten during writing of an adjacent track because of write head positioning errors.

In other magnetic recording systems, in order to increase recording densities, it is desirable to shrink the track pitch and reduce or remove the guard bands between the tracks, which allows more tracks to fit on the recording medium. For example, in "Two-Dimensional Magnetic Recording," also known as "Shingled Magnetic Recording" or "Shingle Write Recording," the tracks are written so that one track partially overlaps the previous track. In such a system, track pitch theoretically may be arbitrarily small.

SUMMARY

A method for writing data onto a medium on which data are stored in tracks includes encoding the data into at least one codeword, and writing a respective portion of each of the at least one codeword onto respective different tracks on the medium. The writing may include writing a respective portion of each of the at least one codeword onto respective different adjacent tracks on the medium.

The method may further include dividing the codeword symmetrically to form each respective portion. The dividing may include apportioning all of any one symbol in the codeword to a single one of the different adjacent tracks. Alternatively, the dividing may include apportioning portions of any one symbol in the codeword to different ones of the different adjacent tracks.

The dividing may instead include dividing the codeword asymmetrically to form each respective portion.

Another method for reading data that have been encoded into codewords includes positioning a plurality of read heads to read codewords that have been written across multiple tracks of a medium, with the plurality of read heads being positioned relative to a first group of the multiple tracks so that each read head in the plurality of read heads reads a different portion of the first group of the multiple tracks, and where each different portion of the multiple tracks overlaps at least one other different portion of the multiple tracks. Signals are detected from the plurality of read heads, and the detected signals are decoded.

A storage device may include a storage medium having thereon more than one track of data that have been encoded into codewords, and reading apparatus. The reading apparatus includes a plurality of read heads for positioning to read codewords that have been written across multiple tracks of a medium, with the plurality of read heads being for positioning relative to a first group of the multiple tracks so that each read head in the plurality of read heads reads a different portion of the first group of the multiple tracks, and where each different portion of the multiple tracks overlaps at least one other different portion of the multiple tracks. Detector circuitry detects signals from the plurality of read heads, interleaver circuitry combines the detected signals, and decoder circuitry that decode the combined detected signals.

Another storage device includes writing apparatus that writes to a storage medium having more than one track of data that have been encoded into codewords, with each codeword being written across multiple tracks of the medium. The writing apparatus includes encoder circuitry that encodes the data into at least one codeword, and controller circuitry that causes the write head to write each respective portion of each of the at least one encoded codeword onto respective different tracks on the medium.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 6 shows a known arrangement of codewords along tracks of a storage medium;

FIG. 7 shows an arrangement of codewords along tracks of a storage medium in accordance with this disclosure;

FIG. 8 shows a simplified write channel;

DETAILED DESCRIPTION

This disclosure relates to a method and system for writing data to, and reading data from a data track that may overlap with one or more adjacent data tracks. In accordance with this disclosure, codewords may be written (or "interleaved") across multiple tracks. The disclosure applies to any number of read heads (as long as there are at least two read heads) and any number of tracks up to the number of read heads (as long as there are at least two tracks). In general, there may be m read heads and codewords may be interleaved across n tracks, where m≥22, n≥22, and n≤m. In a practical example described below, there are two read heads, and the codewords are interleaved across two tracks (i.e., m=n=2).

Figure 1:
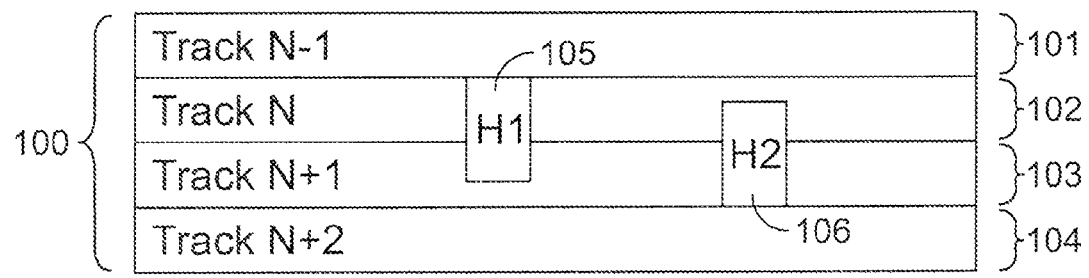
FIG. 1 shows a simplified schematic view of a portion of a storage device.

FIG. 1 shows a simplified schematic view of a portion of a storage device showing four adjacent data tracks 101, 102, 103, 104 on a storage medium 100, with two read heads 105, 106. Read heads 105 and 106 are positioned so that both read heads 105 and 106 are over tracks N (102) and N+1 (103), with read head 105 mainly over track N (102) and read head 106 mainly over track N+1 (103). It should be noted that while the tracks are shown in this and other drawings as being straight, in reality, on the surface of a disk drive platter, the tracks ordinarily would be curved.

As is known, data may be written "downtrack"—i.e., along each track 102, 103, and by reading portions of the two tracks 102, 103 twice using the two read heads 105, 106, inter-track interference may be cancelled out to provide clean data from each of tracks 102, 103.

Figure 2:
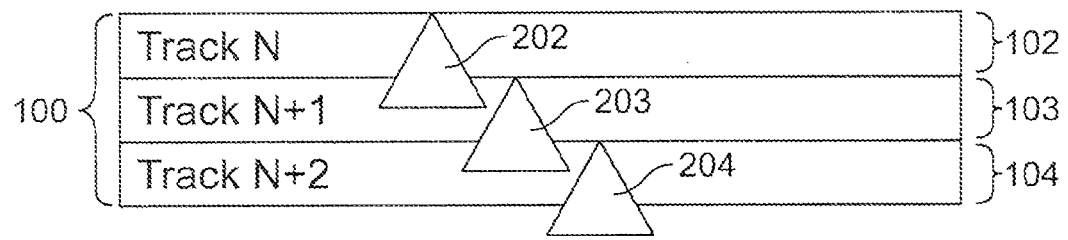
FIG. 2 shows a first writing scenario.
Figure 3:
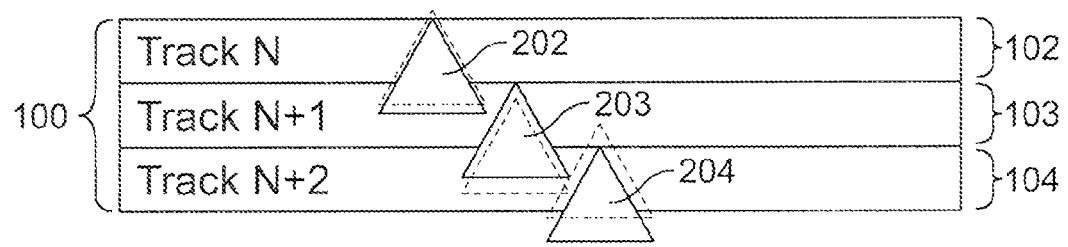
FIG. 3 shows a second writing scenario.

The writing operation for the known scenario is shown for three tracks N (102), N+1 (103) and N+2 (104) in FIGS. 2 and 3. In FIG. 2, each of write heads 202, 203, 204 writes to one of tracks N (102), N+1 (103) and N+2 (104), respectively. In this idealized write scenario, write heads 202, 203, 204 maintain alignment with tracks N (102), N+1 (103) and N+2 (104), respectively, resulting in tracks of uniform pitch. However, a real scenario is more likely to resemble FIG. 3, where write heads 202, 203, 204 vary in alignment with respective tracks N (102), N+1 (103) and N+2 (104), resulting in varying track pitch, and consequently in inter-track interference (ITI). As discussed above, ITI may be overcome in a known manner by reading the same tracks with two different read heads 105, 106, each differently aligned with respect to a target track and an interfering track, so that the interfering track signals can be filtered or subtracted out.

Figure 4:
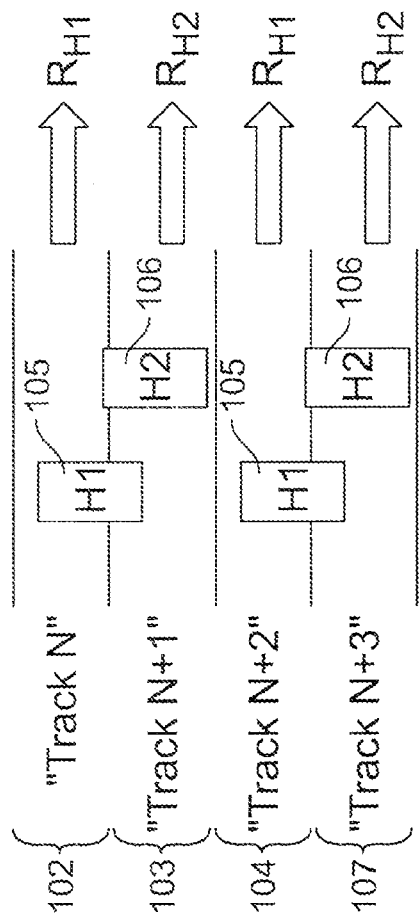
FIG. 4 shows a reading scenario.

In accordance with embodiments of this disclosure, two read heads so arranged can be used to derive data from both of the two adjacent tracks. Thus before, to read each of tracks N (102), N+1 (103), N+2 (104) and N+3 (107), the read heads would first be placed over tracks N (102) and N+1 (103) to read track N (102), then over tracks N+1 (103) and N+2 (104) to read track N+1 (103), then over tracks N+2 (104) and N+3 (107) to read track N+2 (104), and then over tracks N+3 (107) and N+4 (not shown) to read track N+3 (107). But in accordance with embodiments of this disclosure, as shown in FIG. 4, read heads 105, 106 would first be placed over tracks N (102) and N+1 (103) to read tracks N (102) and N+1 (103), then over tracks N+2 (104) and N+3 (107) to read tracks N+2 (104) and N+3 (107). Here, where n=2, read throughput would be doubled; more generally, read throughput would be increased by a factor of n.

In addition, interleaved detection and decoding as described below may have improved results in instances where the signal-to-noise ratio (SNR) is not uniform across the different tracks, making decoding failure less likely. Similarly, there may be an improved bit-error ratio across tracks.

Figure 5:
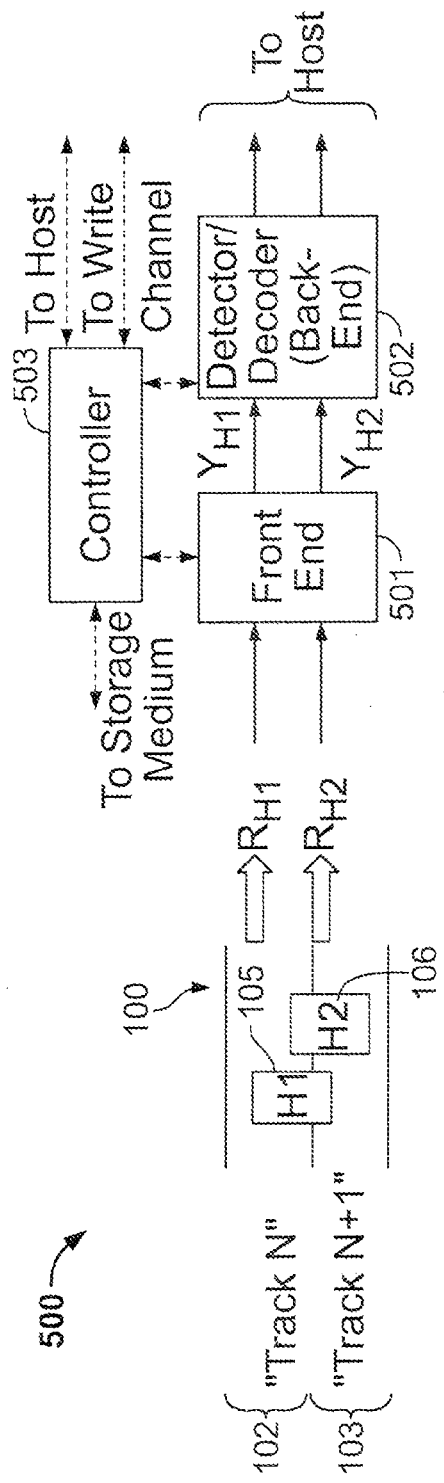
FIG. 5 shows a simplified read channel.

FIG. 5 shows a simplified read channel 500 including read heads 105, 106 denoted as H1 and H2, reading from two adjacent tracks N (102) and N+1 (103). The signals output by heads 105, 106, respectively, may be denoted as $R_{H1}$ and $R_{H2}$. The data sequences represented by signals $R_{H1}$ and $R_{H2}$ are processed first by front end 501, which includes an analog-to-digital converter and front-end demodulation to provide digital signals $Y_{H1}$ and $Y_{H2}$. Detection and decoding of signals $Y_{H1}$ and $Y_{H2}$ in accordance with embodiments of this disclosure occur in back end 502, as discussed below. A disk drive controller 503 coordinates the operations of front end 501 and back end 502, as well as the operations of the write channel (not shown in this drawing), the spindle motor that rotates the storage medium 100, and the stepper motor that controls movement of the read heads 105, 106 and the write heads 202, 203, 204.

To take advantage of this disclosure, codewords may be interleaved across tracks. As shown in FIG. 6, in known arrangements, if each codeword is of size K bits, to write two codewords, all K bits of one codeword 601 would be written along track N (102) and all K bits of another codeword 602 would be written along track N+1 (103). However, in accordance with embodiments of this disclosure, the K bits of each codeword are divided across n tracks. This may be done symmetrically, with K/n bits written to each of the n tracks, or asymmetrically (i.e., a different fraction of the K bits is written to each track). As shown in FIG. 7, where n=2, K/2 bits of each codeword 701, 702 are written to each of the two tracks, track N (102) and track N+1 (103).

More generally, many different arrangements of a codeword into multiple tracks are possible. FIG. 8 shows a circuit arrangement 800 in a write channel for encoding data according to embodiments of this disclosure. Incoming data 801 is encoded in encoder 802 using a suitable error correcting code (ECC), which may be a low-density parity check (LDPC) code. One class of ECC codes that may be used in accordance with some implementations is a non-binary LDPC code. However, it should be understood that other suitable ECCs such as Turbo Codes, Bose-Chaudhuri-Hocquenghem (BCH) codes, or Reed-Solomon codes, can be used.

The apportionment of data onto the different tracks may be controlled by data divider 803, which can be a general interleaver block. Symmetric division has been shown for simplicity but, as noted above, asymmetric arrangements also are possible. Thus, data divider block 803 may assign a different "codeword chunk" size to each track. If the division is symmetrical, the codeword chunk sizes are all the same.

Figure 9:
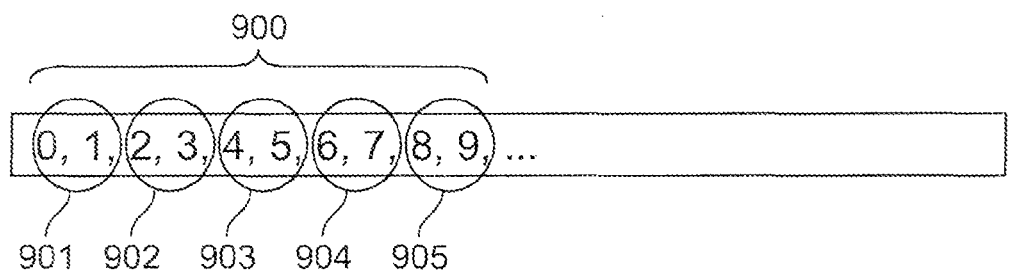
FIG. 9 shows an exemplary codeword.
Figure 10:
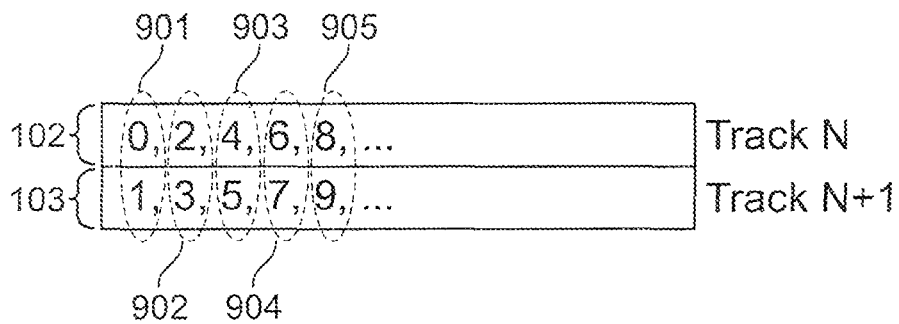
FIGS. 10 and 11 show examples of apportionment, among multiple tracks, of two-bit symbols in a codeword.
Figure 11:
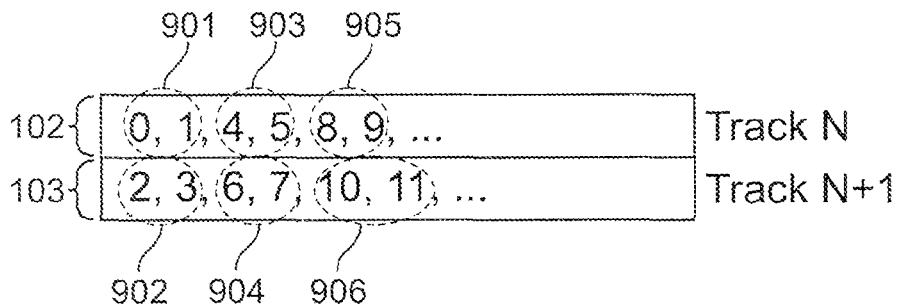

FIGS. 9-13 show examples of how data may be divided across tracks. FIG. 9 shows the first five two-bit GF(4) LDPC symbols 901-905 of a codeword 900 to be allocated. As shown in FIG. 10, each of symbols 901-905 is apportioned symmetrically (one bit per track) across two tracks N (102) and N+1 (103). Alternatively, in FIG. 11, codeword 900 is symmetrically allocated across tracks N (102) and N+1 (103), but each individual symbol 901-906 is written along a single one of tracks N (102) and N+1 (103).

Figure 12:
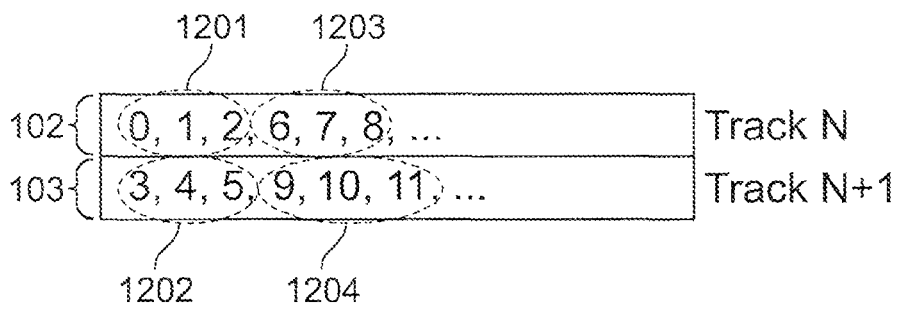
FIGS. 12 and 13 show examples of apportionment, among multiple tracks, of three-bit symbols in a codeword
Figure 13:
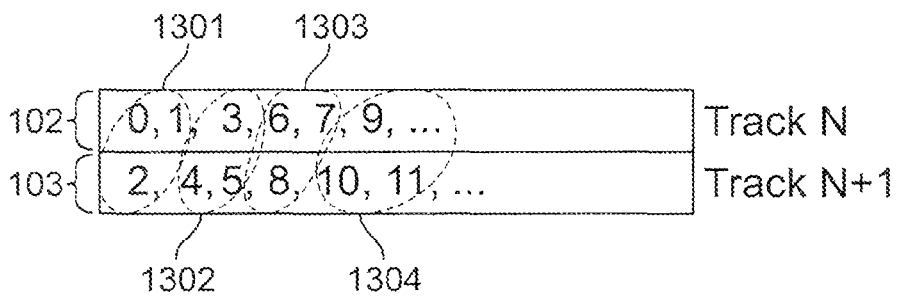

FIGS. 12 and 13 show how a codeword including three-bit GF(8) LDPC symbols may be apportioned. In FIG. 12, the codeword is symmetrically allocated across tracks N (101) and N+1 (102), with each of symbols 1201-1204 written along a single one of tracks N (101) and N+1 (102). Alternatively, in FIG. 13, the codeword is symmetrically allocated across tracks N (101) and N+1 (102), with each of symbols 1301-1304 allocated asymmetrically (because there are three bits) across tracks N (101) and N+1 (102).

Whether the allocation of symbols is along the track, or across tracks, may depend on the amount of underlying ITI across the tracks, and the amount of inter-symbol interference (ISI) along each track, respectively.

As is well known, the data over which the read heads pass is first detected and then decoded. The detector is m-dimensional—i.e., the detector operates on m inputs and produces n outputs—while the decoder operates on the inputs from the n tracks and provides n corresponding outputs. As noted above, the number of tracks over which the codeword is interleaved may be any number, but to support full throughput, the number of tracks over which the codeword is interleaved should be no greater than the number of detector inputs—i.e., n m—so that decoding may be performed in real time, or "on the fly," particularly if multiline read heads are used.

Figure 14:
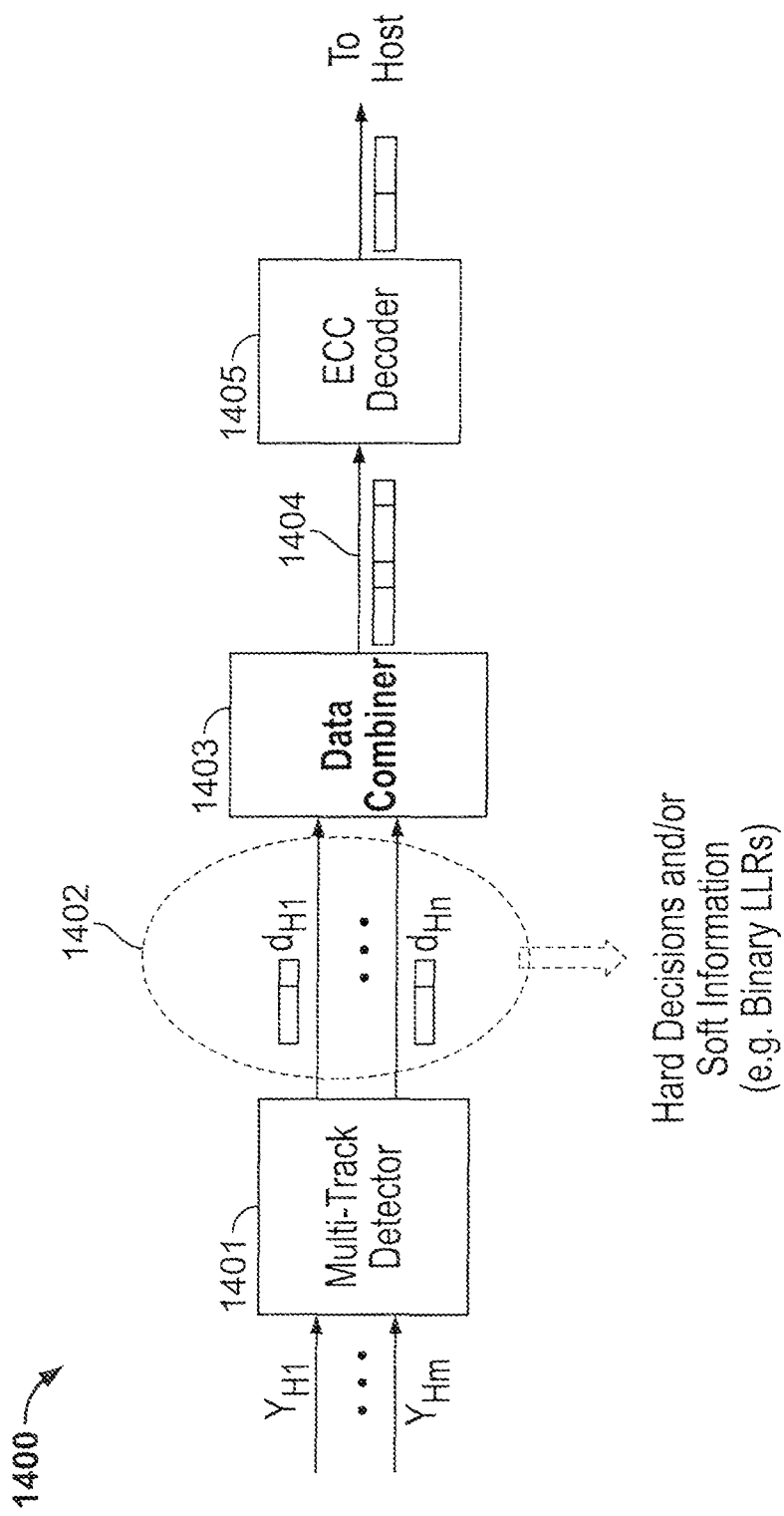
FIG. 14 shows a portion of a read channel according to implementations of this disclosure.

A detecting and decoding arrangement 1400 in which the signals from m read heads covering n tracks (n≤m), where ECC codewords are interleaved across n-tracks is shown in FIG. 14. For simplicity, this diagram assumes a binary ECC code, such as a binary LDPC code. Multi-track detector 1401 may be any suitable detector capable of operating on multi-dimensional signals $Y_{H1}$-$Y_{Hm}$, and providing output 1402 which may be soft output and/or hard output. For example, detector 1401 may be an m-dimensional Viterbi detector, or an m-dimensional Bahl-Cocke-Jelinek-Raviv (BCJR) detector. As noted above, detector 1401, operating on m input signals, may be capable of using the m inputs to deal with inter-track and inter-symbol interference.

The detector outputs 1402, which may be hard decisions or soft information (such as, e.g., binary log-likelihood ratios) may be combined by data combiner 1403, which may be the inverse of data divider 803, combining the detector outputs symmetrically or asymmetrically according to a selected pattern into n tracks. The combined n-track outputs 1404 are then decoded by decoder 1405.

Although detector 1401 is most advantageously an m-input detector with n outputs, an m-input detector with n' outputs (assuming n<n'≤m) also may be used, even though the result may be less optimal. In such an embodiment, n out of n' outputs of the detector are used as inputs to the decoder. This arrangement is possible only in the TDMR case of n<m.

Figure 15:
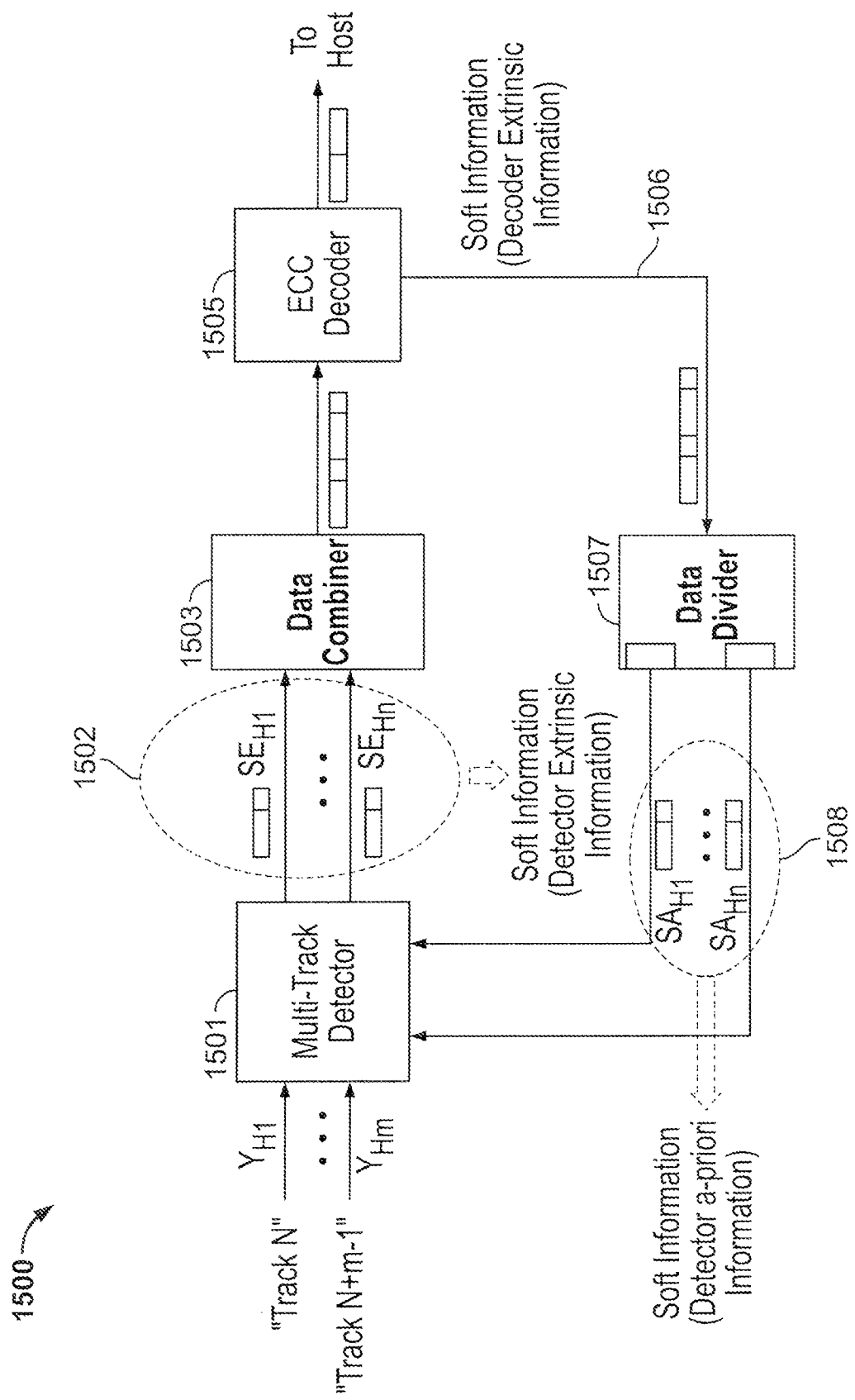
FIGS. 15 and 16 show portions of a read channel according to implementations of this disclosure using iterative decoding.

As shown in the partial read channel 1500 of FIG. 15, the decoder may be an iterative decoder 1505. Here, the outputs of detector 1501 are soft extrinsic detector outputs 1502, and the outputs of decoder 1505 are soft extrinsic decoder outputs 1506. Data divider 1507 is again like data divider 803, providing soft information such as soft a priori detector information 1508 to detector 1501.

With the interleaved coding scheme provided by this disclosure, the information from the ECC decoder 1505 to multi-track detector 1501 is provided in all n tracks (across-track) as well as in the usual along-track or downtrack fashion. Providing extrinsic information across tracks may contribute to improved ITI cancellation task in detector 1501, whether the information provided by decoder 1505 is soft or hard.

In addition, interleaved detection and decoding as described herein may have improved results in instances where the signal-to-noise ratio (SNR) is not uniform across the different tracks. SNR differences may result because, as shown in FIG. 3, write head positioning may vary, resulting in different track widths. Wider tracks generally have better SNR than narrower tracks. In a conventional arrangement such as that of FIG. 6, where an entire ECC codeword is written to a single track, a codeword written to narrower track would exhibit a worse SNR than a codeword written to a wider track, and hence the decoder is more likely to fail on the codeword written to the narrower track. For an arrangement according to this disclosure (e.g., as in FIG. 7), in which each codeword is spread across multiple tracks, even if one part of a codeword is written to a narrower track, it is likely that the adjacent track, to which the other part of that codeword is written, would be wider. Therefore, the codeword would not suffer the worst-case SNR and a decoding failure would be less likely. Similarly, there may be an improved bit-error ratio across tracks.

Figure 16:
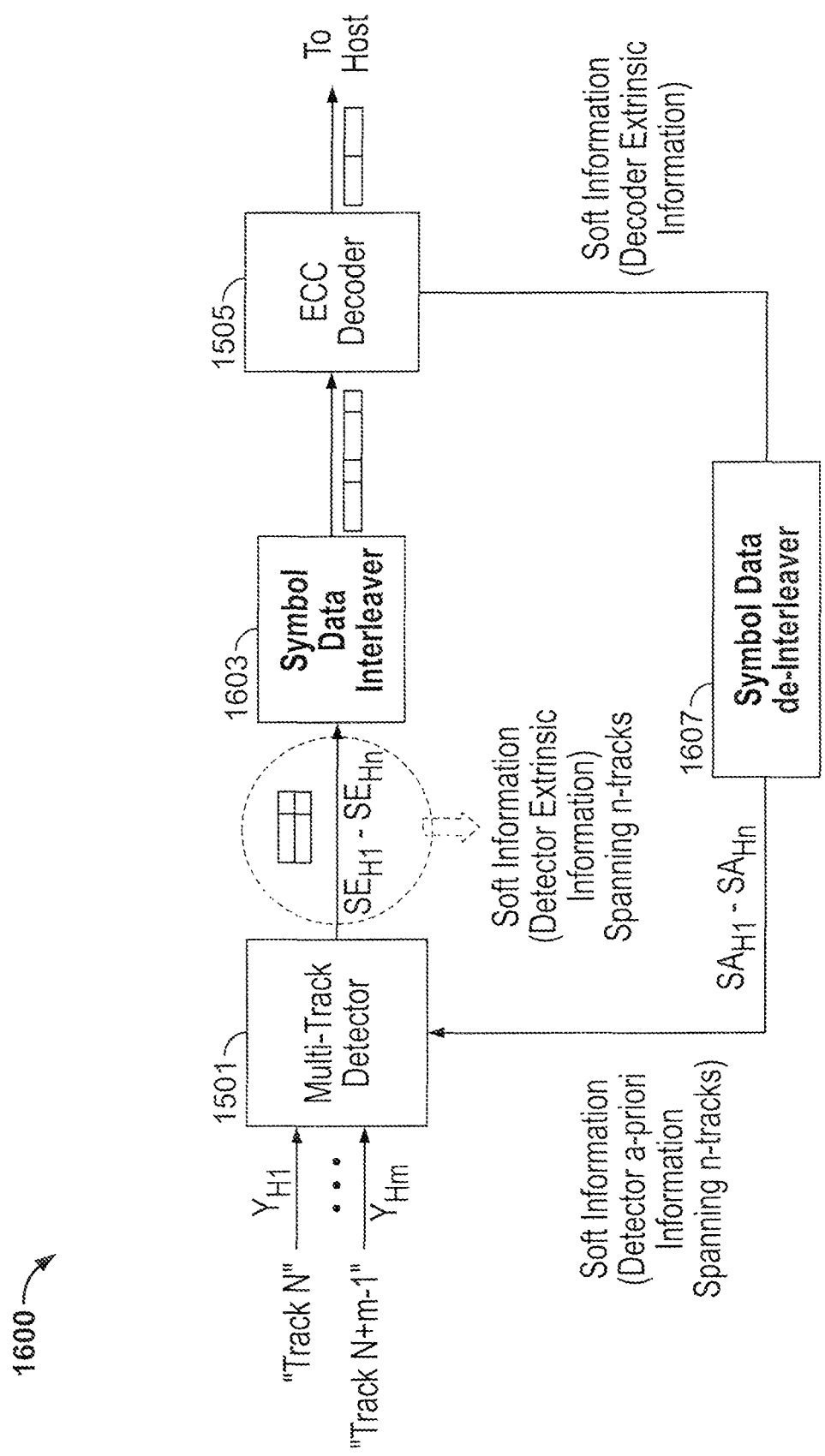

The purpose of data divider 803/1507, and data combiner 1403/1503, is to align bit positions correctly where the error-correcting code is a binary code that provides log-likelihood ratios in a binary domain. This function may be provided by a data interleaver 1603 and de-interleaver 1607 as shown in partial read channel 1600 of FIG. 16. In a non-binary implementation—e.g., where a non-binary LDPC code is used—interleaver 1603 and de-interleaver 1607 may operate to align information on a symbol level rather than a bit level, again in either across-track or downtrack modes.

Figure 17:
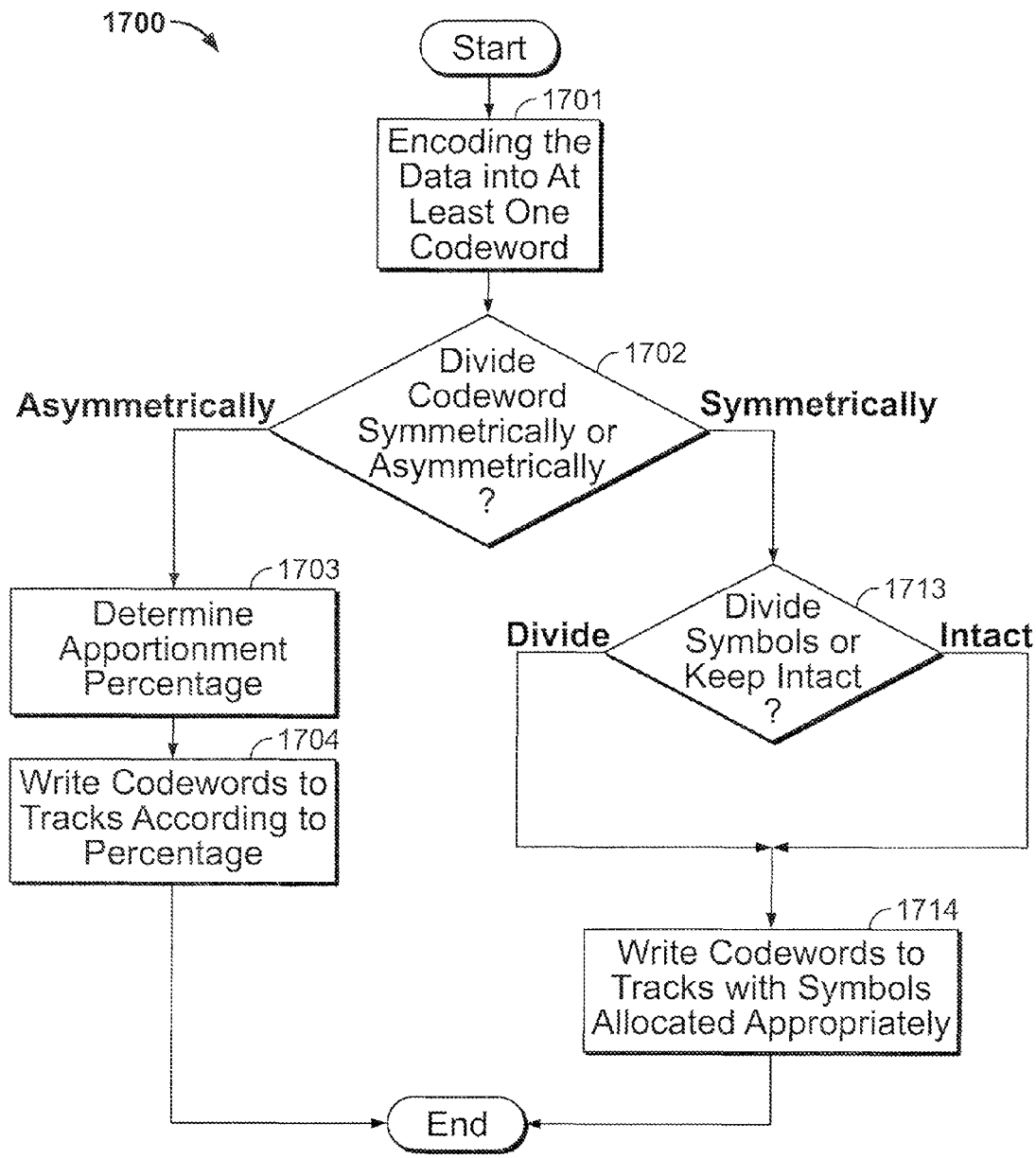
FIG. 17 is a flow diagram of an exemplary method according to this disclosure.

A method 1700 in accordance with embodiments of this disclosure, for writing data onto a medium on which data are stored in tracks, is diagrammed in FIG. 17 and begins at 1701 with encoding of the data into at least one codeword. At 1702 it is determined whether the codeword is to be divided symmetrically or asymmetrically across different tracks. If the codeword is to be divided asymmetrically, then at 1703 the percentage division to each track is set, and at 1704 the codeword portions are divided and written according to that percentage and method 1700 ends.

If at 1702 it is determined that the codeword is to be divided symmetrically, then at 1713 it is determined whether individual symbols of the codeword are to be divided across tracks or kept intact on individual tracks, and at 1714 the symbols of the codeword are divided and written according to that determination and method 1700 ends.

Figure 18:
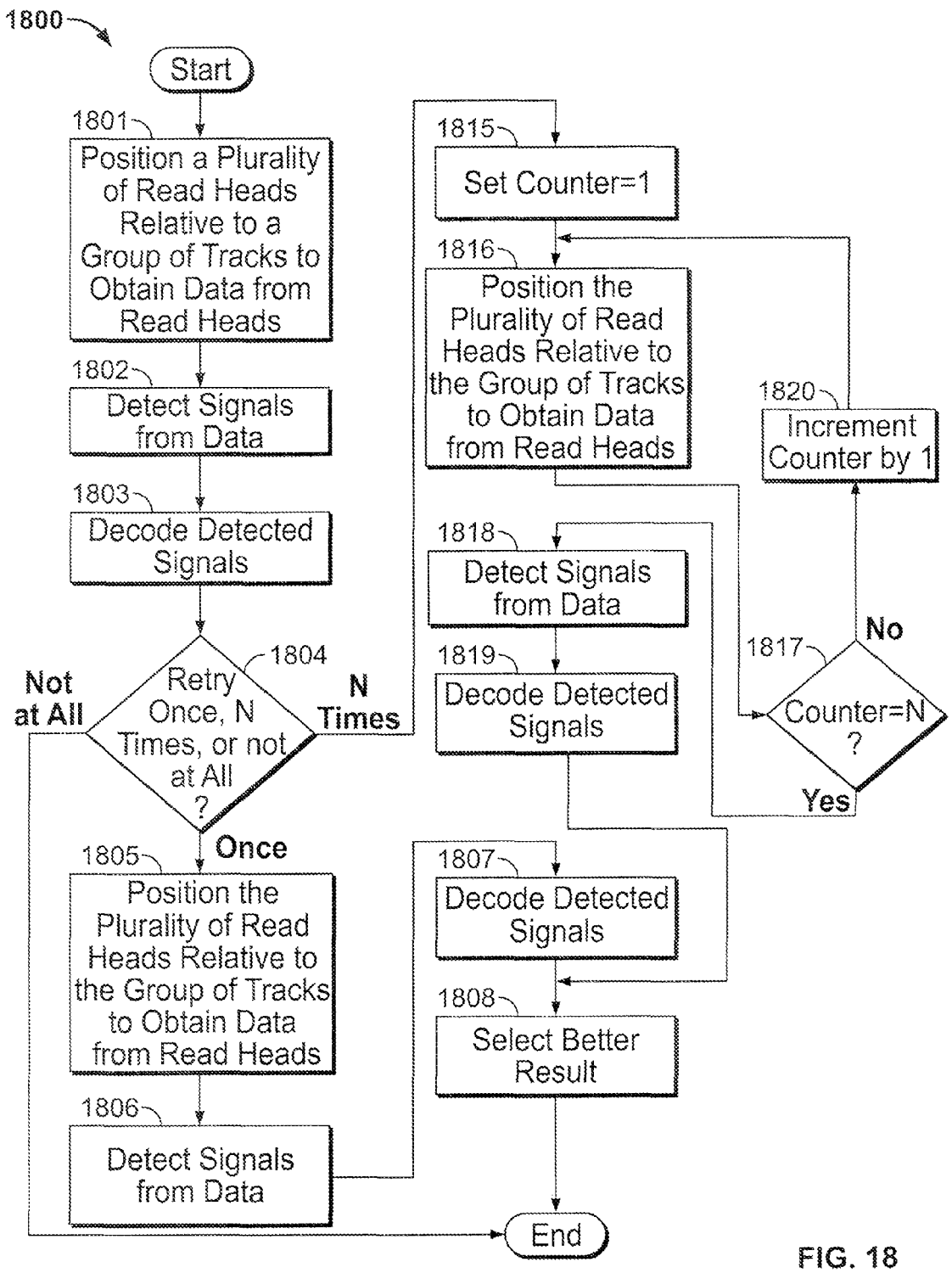
FIG. 18 is a flow diagram of another exemplary method according to this disclosure incorporating a re-try mode.

A method 1800 according to embodiments of this disclosure for reading data that have been encoded into codewords, with each codeword having been written across multiple tracks of a medium, is diagrammed in FIG. 18. Although as illustrated, method 1800 applies to a plurality of read heads reading a group of tracks, method 1800 will be described, for ease of understanding, in terms of m read heads and n tracks.

Method 1800 begins at 1801 where m read heads are positioned (e.g, in the manner described above) relative to n tracks for reading the n tracks. At 1802 signals from the m read heads are used to detect n tracks, and at 1803, the detected signals are decoded.

An optional "re-try mode," which can re-try the decoding either once or N times may be selected at 1804. As an example, N may be the same as n, where n is the number of tracks as discussed above. If re-try mode is not selected (because a single pass is considered sufficient), the method ends. If "re-try once" is selected, then some or all of the m read heads are again positioned, at 1805, relative to the n tracks to favor a track that may have produced a weaker signal on the previous pass. The re-positioned read heads are used to obtain new data to input to the detector. The newly-obtained data for the newly-favored track at the input of the detector (e.g., data $Y_{H1}$ shown in FIGS. 5 and 14-16) may replace the previous version of the data (e.g., replacing whatever data $Y_{H1}$ was obtained at 1801), while some data may be kept (e.g., data $Y_{H2}$ obtained at 1801 may be kept). At 1806, signals are again detected from the newly-chosen data $Y_{H1}, \ldots, Y_{Hm}$. At 1807, the detected signals are again decoded. At 1808, the better result (from decoding 1803 and decoding 1807) is selected.

If at 1804, "re-try N times" is selected, then at 1815, a counter is set to 1. At 1816, some or all of the m read heads are again positioned relative to the n tracks to favor a track that may have produced a weaker signal on a previous pass. The re-positioned read heads are used to obtain new data to input to the detector. The newly-obtained data for the newly-favored track at the input of the detector (e.g., data $Y_{H1}$ shown in FIGS. 5 and 14-16) may replace the previous version of the data (e.g., replacing whatever data $Y_{H1}$ was obtained at 1801), while some data may be kept (e.g., data $Y_{H2}$ obtained at 1801 may be kept).

At 1817 it is determined whether the counter value, which may be referred to as j, is equal to N. If the counter value j is equal to N, then, at 1818, signals are again detected from the newly-chosen data $Y_{H1}, \ldots, Y_{Hm}$, and at 1819, the detected signals are again decoded.

If at 1817 the counter value j was less than N, the counter value j is incremented at 1820, and the collection of data inputs for the detector continues. At 1816, some or all of the m read heads are again re-positioned to favor one of the tracks. The newly re-positioned read heads are again used to obtain new data to input to the detector. The newly-obtained data for the newly-favored track at the input of the detector (e.g., if the counter value j is 2, data $Y_{H2}$ shown in FIGS. 5 and 14-16) may replace the previous version of the data (e.g., replacing whatever data $Y_{H2}$ was obtained at 1801). This is repeated for each value of the counter (counter values j=1, 2, ..., N). For example, at any counter value j, at 1816, some or all of the m read heads are yet again re-positioned to favor a particular track. The newly re-positioned read heads are again used to obtain new data to input to the detector. The newly-obtained data for the newly-favored track at the input of the detector (e.g., while not explicitly shown in FIGS. 5 and 14-16, data $Y_{Hj}$ from among data $Y_{H1}$-$Y_{Hm}$) may replace the previous version of the data (e.g., replacing whatever data $Y_{Hj}$ was obtained at 1801).

Eventually, the counter value j will reach N, at which point, as discussed above, at 1818, signals are again detected from the newly-chosen data $Y_{H1}, \ldots, Y_{Hm}$, and at 1819, the detected signals are again decoded. At 1808, the better result (from decoding 1803 and decoding 1818) is selected.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for reading data that have been encoded into codewords, the method comprising:
    positioning a plurality of read heads to read codewords that have been written across multiple tracks of a medium, the plurality of read heads being positioned relative to a first group of the multiple tracks so that each read head in the plurality of read heads reads a different portion of the first group of the multiple tracks, wherein each different portion of the multiple tracks overlaps at least one other different portion of the multiple tracks;
    obtaining data from the plurality of read heads;
    detecting signals from the obtained data;
    decoding the detected signals;
    positioning the plurality of read heads relative to a second group of the multiple tracks so that each read head in the plurality of read heads reads a different portion of the second group of the multiple tracks, wherein each different portion of the second group of multiple tracks overlaps at least one other different portion of the second group of multiple tracks, and wherein the second group of multiple tracks includes the first number of tracks;
    again obtaining data from the plurality of read heads;
    again detecting signals, from data obtained during the again obtaining;
    again decoding signals, from the again detecting; and
    selecting a better result from between the decoding and the again decoding.

2. The method of claim wherein the first group of multiple tracks includes a first number of tracks, the plurality of read heads includes a second number of read heads, and the second number is at least equal to the first number.

3. The method of claim 2 wherein the second number is equal to the first number.

4. The method of claim 3 wherein the first number and the second number are both 2.

5. A method for reading data that have been encoded into codewords, the method comprising:
    positioning a plurality of read heads to read codewords that have been written across multiple tracks of a medium, the plurality of read heads being positioned relative to a first group of the multiple tracks so that each read head in the plurality of read heads reads a different portion of the first group of the multiple tracks, wherein each different portion of the multiple tracks overlaps at least one other different portion of the multiple tracks;
    obtaining data from the plurality of read heads;
    detecting signals from the obtained data;
    decoding the detected signals;
    repeating the positioning a selected number of times after the obtaining, the detecting and the decoding, and for each repetition of the positioning, again obtaining data from the plurality of read heads;
    again detecting signals, based on data obtained during repetitions of the again obtaining;
    again decoding the signals, from the again detecting; and
    selecting a better result from between the decoding and the again decoding.

6. The method of claim 5 wherein the first group of multiple tracks includes a first number of tracks, the plurality of read heads includes a second number of read heads, and the second number is at least equal to the first number.

7. The method of claim 6 wherein the second number is equal to the first number.

8. The method of claim 7 wherein the first number and the second number are both 2.

* * * * *